Feb. 21, 1939.  L. R. CAMBRON ET AL  2,147,783
METHOD FOR THE ACID TREATMENT OF CLAY
Filed May 13, 1936
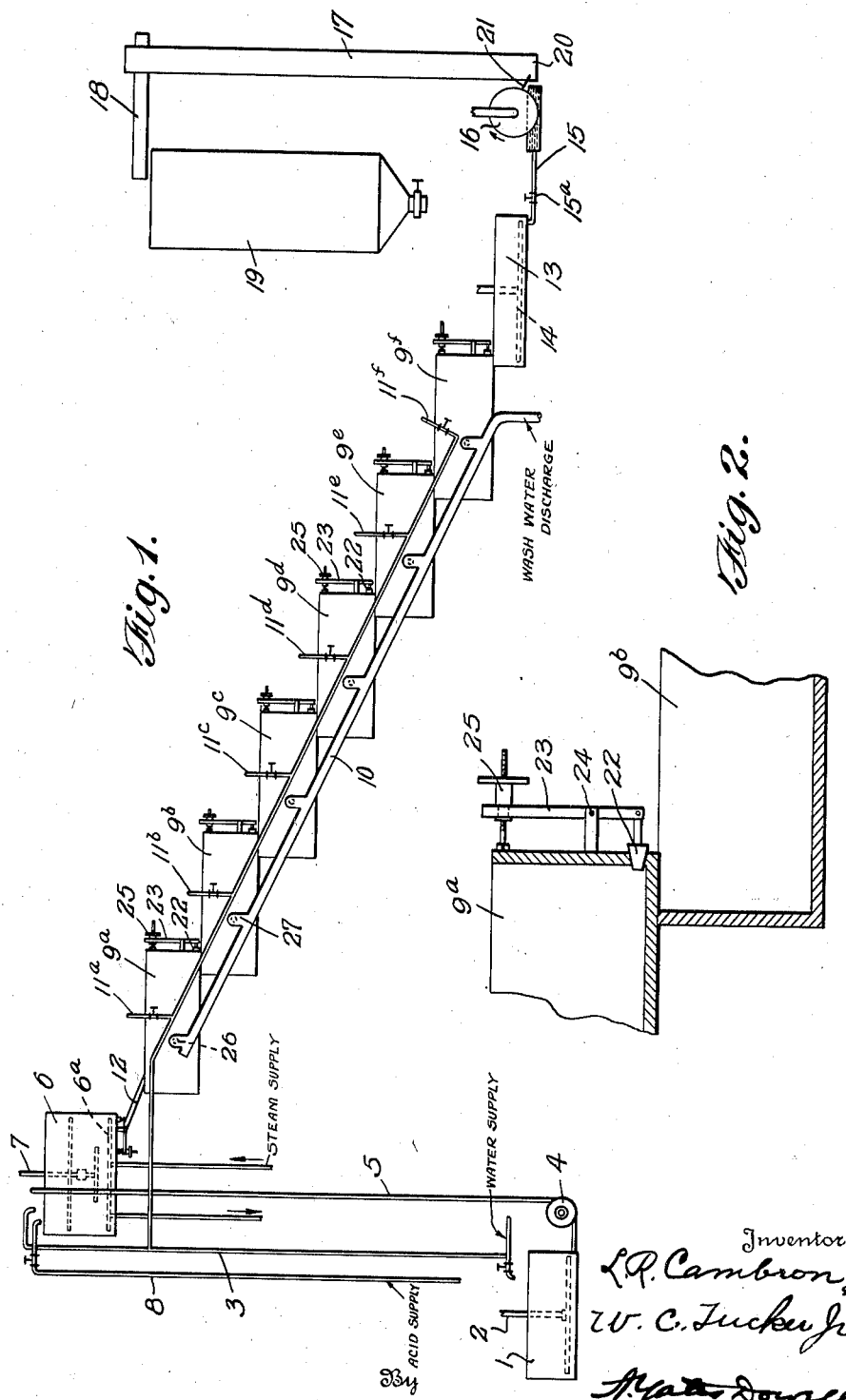

Patented Feb. 21, 1939

2,147,783

UNITED STATES PATENT OFFICE 2,147,783

METHOD FOR THE ACID TREATMENT OF CLAY

Louis R. Cambron and Woodson C. Tucker, Jr., Ocala, Fla.

Application May 13, 1936, Serial No. 79,578

3 Claims. (Cl. 252—2)

This invention relates to the activation of clay or argillaceous material, such for instance as bentonite, montmorillonite and the like.

Acid treatment of clays to render them active or to increase their activity has been practised for many years back, and although innumerable methods have been advanced in recent years dealing with relative proportions of materials, application of heat, etc., and minor changes in steps of procedure, the practice is and always has been basically the same. One angle, however, which has apparently been dealt with lightly by the proponents of the art is simplification of the apparatus and elimination or reduction of moving parts and corrosion-resistant equipment, and since the clay and acid mixture causes rapid wear and corrosion of agitators, force feed mechanism and like parts coming in contact therewith, the problem is one which merits special consideration.

The primary object of the present invention, therefore, is to provide an improved method of activating clay and apparatus for carrying out the method which is materially simplified with respect to prior known methods and apparatus.

Another object is to provide a method and apparatus for activating clay whereby treatment of the clay containing any acid is accomplished without the use of moving parts or mechanism which would be damaged by contact with the acid clay mixture.

A further and more specific object is to provide an apparatus for the acid treatment of clay or clay-like material wherein the requirement for corrosion resistant equipment in the washing process is substantially eliminated.

The foregoing and other objects and advantages will become apparent in view of the following description taken in conjunction with the drawing, wherein, Figure 1 is a diagrammatic view of an apparatus suitable for carrying out the improved method, and Figure 2 is an enlarged detail view showing a preferred type of valve mechanism for the tanks.

While the illustration in the drawing is more or less diagrammatic, it is of sufficient detail to teach one skilled in the clay-treating art how to construct an operative installation.

Referring in detail to the drawing, 1 is a tank for the raw clay, this tank having therein an agitator 2 for agitating the clay to form a slime. 3 is the water line for feeding water to the agitating tank 1 and also to the remaining tanks to be described. A slime pump 4 is disposed adjacent the tank 1, and a pipe line 5 leads from the tank 1 to the pump 4 and then upwardly to a treating tank 6, which is arranged at a predetermined elevation. This tank 6 has a heating coil 6a and an agitator 7 therein. An acid line 8 extends to a suitable source of supply at its inlet end and at its outlet end feeds into the tank 6.

Starting with the tank 6 and arranged in stepped relation downwardly are a series of washing tanks 9a, 9b, 9c, 9d, 9e and 9f, and extending adjacent these tanks are water feed lines 11a, 11b, 11c, 11d, 11e and 11f. 10 is a waste wash water line and 12 is a short trough leading from the treating tank 6 to the first washing tank.

The last of the stepped tanks is indicated at 13 and in this tank the wet clay is held previous to drying. An agitator 14 is operatively mounted in this tank. 15 is a pipe line leading from tank 13 to the receiving pan of a drier 16. This drier is preferably of the rotary steam drum type well known in the art, and mounted within operative adjacency to the drum is a scraper 21 for removing the dry clay from the surface of the drum. 17 is an elevator and 18 is a conveyor for conducting the dried material to the elevator, which delivers it to a storage bin 19.

Each of the washing tanks 9a to 9f is provided with a valve 22 which is in the form of a plug mounted on a lever 23 fulcrumed at 24, the lever 23 at its upper end being controlled by a hand screw 25. Also drain plugs 26 are provided in each of the said washing tanks for drawing off supernatant water, and baffles 27 are provided on conduit 10 to prevent overrunning of the water when the plugs 26 are drawn.

The method is preferably carried out as follows:

Raw or neutral clay is introduced into the tank 1 and water is added from the pipe line 3, the clay being thoroughly agitated in this tank to form a slurry or slime. This slurry or slime is pumped into tank 6 by pump 4 and is agitated in this tank while acid is added in the desired quantity through line 8. If the clay has previously been dried and ground it may be introduced directly into the acid solution in tank 6. After the desired acid solution and clay mixture has been formed in tank 6, the mixture is heated by steam coil 6a and agitated for the desired length of time. After proper treatment, the mixture is then allowed to flow through the trough 12 into the tank 9a, where more water is added to bring the mixture up to the desired volume. The clay is now allowed to settle, and after substantially complete settling the supernatant wash water is drawn off into line 10. The valve plug 22 is now released, a stream of water under pressure from line 11a directed into the tank 9a, and the clay is agitated and a slurry is formed which is forced to flow through the valve opening into the next succeeding tank 9b, where the solution is again brought up to the desired volume by the addition of water, if necessary, and allowed to settle. Again after settling the supernatant water is drawn off into line 10, the valve plug of this tank removed, water applied and the clay agitated and caused to flow into the tank 9c; this procedure being continued until the clay reaches the bottom tank 13.

In causing the clay to flow from tank 9f into tank 13, as small an amount of water as efficiently possible is used and no additional water is added in tank 13.

In the tank 13 the clay is continually agitated to keep it in fluid form, and from this tank the clay is allowed to flow through the line 15 into the receiving pan of drier 16. The pipe line 15 is preferably provided with a valve 15a in order to regulate the flow so that the drier 16 will be able to take care of the clay delivered thereto. The scraper 21 removes the dry clay from the surface of the drier and the clay thus removed falls into the conveyor 20. The temperature of the drier should be regulated to dry the clay adhering to the surface of the drier drum by the time it reaches scraper 21, and the travel of the conveyor 20 should be regulated to take care of the dried clay delivered thereto from the drum, as will be obvious.

From the conveyor 20, the clay goes up through the elevator 17 and is delivered into the storage bin 19, from which it may be sacked for shipment.

It will be noted that no acid contacts any of the moving parts outside of the agitator 7, since the acid is not added until the clay reaches tank 6, and by the time the acid-clay mixture reaches the tank 13, the acid has been washed clear of the clay. Furthermore, the number of moving parts in the complete installation are considerably less than those embodied in the conventional apparatus used for the acid-treatment of clay.

It will be understood that certain variations in the steps of the method and type of apparatus used may be made without departing from the scope of the invention as defined in the appended claims.

We claim:

1. The method of activating clay which consists in forming a fluent slurry of clay and water, conducting the slurry to a container sufficiently elevated to permit subsequent washing treatment of the clay by gravity flow, adding acid to the slurry and agitating and heating the acid-clay mixture, and then washing the clay in steps by permitting the clay to settle, drawing off supernatant water and again forming a slurry by adding water to the settled clay and repeating the washing steps until the clay is substantially free of acid.

2. The method of activating clay which consists in forming a fluent slurry of raw clay and water, conducting the slurry to a container sufficiently elevated to permit subsequent washing treatment of the clay by downward flow, adding acid to the slurry and agitating and heating the acid-clay mixture, and then washing the clay in repeated steps by permitting the clay to settle, drawing off supernatant water and adding water under pressure to the settled clay to form a slurry and at the same time wash the clay from one washing tank to another until the clay is substantially free of acid.

3. The method of activating clay which consists in forming a fluent slurry of clay and water, conducting the slurry to a container sufficiently elevated to permit subsequent washing treatment of the clay by downward flow, adding acid to the slurry and agitating and heating the acid-clay mixture, adding water to bring the mixture to the desired volume, and then washing the clay in repeated steps by permitting the clay to settle, drawing off supernatant water and adding water to the settled clay to form a slurry and conducting the slurry so formed from one washing tank to another until the clay is substantially free of acid, and then passing the clay to a drier to dry the clay.

LOUIS R. CAMBRON.
WOODSON C. TUCKER, Jr.